United States Patent
Savry et al.

(10) Patent No.: US 10,439,798 B2
(45) Date of Patent: Oct. 8, 2019

(54) METHOD FOR CONFIDENTIAL EXECUTION OF A PROGRAM OPERATING ON DATA ENCRYPTED BY A HOMOMORPHIC ENCRYPTION

(71) Applicant: COMMISSARIAT A L'ENERGIE ATOMIQUE ET AUX ENERGIES ALTERNATIVES, Paris (FR)

(72) Inventors: Olivier Savry, Sassenage (FR); Thomas Hiscock, Grenoble (FR)

(73) Assignee: COMMISSARIAT A L'ENERGIE ATOMIQUE ET AUX ENERGIES ALTERNATIVES, Paris (FR)

(*) Notice: Subject to any disclaimer, the term of this patent is extended or adjusted under 35 U.S.C. 154(b) by 235 days.

(21) Appl. No.: 15/440,157

(22) Filed: Feb. 23, 2017

(65) Prior Publication Data
US 2017/0244553 A1 Aug. 24, 2017

(30) Foreign Application Priority Data
Feb. 24, 2016 (FR) ...................................... 16 51502

(51) Int. Cl.
*H04L 9/00* (2006.01)
*G06F 21/72* (2013.01)

(52) U.S. Cl.
CPC .............. *H04L 9/008* (2013.01); *G06F 21/72* (2013.01); *H04L 2209/12* (2013.01)

(58) Field of Classification Search
CPC ...... H04L 9/008; H04L 2209/12; G06F 21/72
USPC ....................................................... 713/190
See application file for complete search history.

(56) References Cited

U.S. PATENT DOCUMENTS

| | | | |
|---|---|---|---|
| 6,891,503 B1 | 5/2005 | Savry et al. | |
| 7,841,528 B2 | 11/2010 | Savry et al. | |
| 8,022,810 B2 | 9/2011 | Savry et al. | |
| 8,106,845 B2 | 1/2012 | Savry | |
| 8,110,894 B2 | 2/2012 | Savry et al. | |
| 8,141,787 B2 | 3/2012 | Savry | |
| 8,249,502 B2 | 8/2012 | Savry | |
| 8,515,058 B1* | 8/2013 | Gentry | H04L 9/008 380/28 |
| 8,653,938 B2 | 2/2014 | Savry et al. | |
| 8,699,949 B2 | 4/2014 | Thevenon et al. | |
| 2009/0119518 A1* | 5/2009 | Staddon | G06F 21/6227 713/193 |

(Continued)

FOREIGN PATENT DOCUMENTS

WO WO 2015/008607 A1 1/2015

OTHER PUBLICATIONS

U.S. Appl. No. 12/899,852, filed Oct. 7, 2010, 2011/0084796 A1, Olivier Savry, Apr. 2011.

(Continued)

*Primary Examiner* — Teshome Hailu
(74) *Attorney, Agent, or Firm* — Oblon, McClelland, Maier & Neustadt, L.L.P.

(57) ABSTRACT

A method of executing a program operating on data encrypted by a homomorphic encryption. Execution of a program instruction includes the homomorphic evaluation of an associated function in the ciphertext space, homomorphic masking of the result of the evaluation with a previously encrypted random sequence, decryption of the evaluation result thus masked followed by a new encryption and then homomorphic unmasking in the ciphertext space. The result of execution of the instruction does not appear in plain text at any time during execution of the instruction.

9 Claims, 3 Drawing Sheets

(56) References Cited

U.S. PATENT DOCUMENTS

| | | | |
|---|---|---|---|
| 2012/0054485 A1* | 3/2012 | Tanaka | H04L 9/008 |
| | | | 713/150 |
| 2013/0097431 A1* | 4/2013 | Hriljac | G06F 21/125 |
| | | | 713/189 |
| 2014/0177828 A1* | 6/2014 | Loftus | H04L 9/008 |
| | | | 380/44 |
| 2014/0208101 A1* | 7/2014 | Naganuma | G06F 21/60 |
| | | | 713/164 |
| 2015/0381348 A1 | 12/2015 | Takenaka et al. | |

OTHER PUBLICATIONS

U.S. Appl. No. 15/412,252, filed Jan. 23, 2017, Florian Pebay-Peyroula et al.

French Preliminary Search Report dated Nov. 29, 2016 in French Application 16 51502 filed on Feb. 24, 2016 (with English Translation of Categories of Cited Documents).

Peter T. Breuer, et al., "A Fully Homomorphic Crypto-Processor Design Correctness of a Secret Computer", Engineering Secure Software and Systems, 2013, 16 pgs.

Craig Gentry, "A fully homomorphic encryption scheme", Doctoral Dissertation, Stanford University, 2009, 209 pgs.

Joppe W. Bos, et al., "Improved Security for a Ring-Based Fully Homomorphic Encryption Scheme", Cryptology ePrint Archive, Microsoft Research, 2013, 30 pgs.

Junfeng Fan, et al., "Somewhat Practical Fully Homomorphic Encryption", Cryptology ePrint Archive, 2012, 19 pgs.

Yuval Ishai, et al., "Private Circuits: Securing Hardware Against Probing Attacks", Proc. of Annual International Cryptology Conference, 2003, 19 pgs.

\* cited by examiner

METHOD FOR CONFIDENTIAL EXECUTION OF A PROGRAM OPERATING ON DATA ENCRYPTED BY A HOMOMORPHIC ENCRYPTION

TECHNICAL DOMAIN

The purpose of this invention is related to the domain of secure processors and more particularly secure calculation by homomorphic encryption.

STATE OF PRIOR ART

Large amounts of research have recently been made on secure calculations, based particularly on homomorphic encryption techniques.

Homomorphic encryption can be used to perform operations (in practice arithmetic addition or multiplication operations and equivalent logical operations) on data without ever exposing these data. More precisely, a homomorphic encryption is an asymmetric key $Enc_{pk}$ (public key pk) encryption in which the following property is satisfied:

$$Enc_{pk}: X \rightarrow Y$$

$$Dec_{sk}[Enc_{pk}(a) \oplus Enc_{pk}(b)] = a+b \quad (1)$$

in which X is the unencrypted messages space (more simply called the plaintext space) and Y is the encrypted messages space (more simply called the ciphertext space), + is an additive operation in the plaintext space conferring a group structure on X, and $\oplus$ is an operation in the ciphertext messages space conferring a group structure on Y. It is thus understood that the application of (X,+) in (Y,$\oplus$) is a homomorphism of groups. $Dec_{sk}$ is the decryption function corresponding to $Enc_{pk}$ (in which sk is the user's secret key).

If follows from expression (1) that it is possible to perform an additive operation between two plaintexts (a , b) from a corresponding operation between their ciphertexts ($Enc_{pk}(a)$, $Enc_{pk}(b)$).

More generally, a homomorphic encryption can be considered to be a ring morphism between the plaintext space (including +,× operations) and the ciphertext space (including the corresponding $\oplus$,$\otimes$ operations). We then have the following properties:

$$Dec_{sk}(Enc_{pk}(a+b)) = Dec_{sk}(Enc_{pk}(a) \oplus Enc_{pk}(b)) = a+b \quad (2\text{-}1)$$

$$Dec_{sk}(Enc_{pk}(a \times b)) = Dec_{sk}(Enc_{pk}(a) \otimes Enc_{pk}(b)) = a \times b \quad (2\text{-}2)$$

Therefore, using operations (2-1) and (2-2), it is possible to evaluate an arbitrary function F , that can be broken down into elementary addition and multiplication operations, in the ciphertext space and then decrypt the result.

Similarly, an arbitrary logical function F that can be broken down into elementary AND, OR and NOT logical functions can be evaluated in the ciphertext space. This is done by converting these logical operations into arithmetic operations:

$$AND(x,y) = xy \quad (3\text{-}1)$$

$$NOT(x) = 1-x \quad (3\text{-}2)$$

$$OR(x,y) = NOT(AND(NOT(x), NOT(y))) = 1-(1-x)(1-y) \quad (3\text{-}3)$$

and members at the right of equations (3-1) to (3-3) are calculated in the ciphertext space.

When a function F is defined in the plaintext space, the equivalent function in the ciphertext space will be denoted $\bar{F}$ in the following. In other words:

$$F(m_1, \ldots, m_M) = Dec_{pk}(\bar{F}(Enc_{pk}(m_1), \ldots, Enc_{pk}(m_M))) \quad (4)$$

in which $m_1, \ldots, m_M$ are unencrypted data. The term at the left corresponds to an evaluation in the plaintext space and $\bar{F}(Enc_{pk}(m_1), \ldots, Enc_{pk}(m_M))$ corresponds to an evaluation in the ciphertext space, also called a homomorphic evaluation. Thus, a homomorphic evaluation $H.Eval_{pk}(F)$ is made to correspond to an unencrypted evaluation of F.

Homomorphic encryption methods were first introduced following Craig Gentry thesis entitled "A fully homomorphic encryption scheme".

Current homomorphic cryptosystems are widely based on encryptions derived from the LWE (Learning With Errors) or RLWE (Ring Learning With Errors) problem. In these cryptosystems, encryption consists of masking a message with noise. Conversely, decryption consists of removing this noise, that is possible if the private key of the cryptosystem is known but on the other hand is very difficult if it is not known. Homomorphic operations keep this masking naturally, or even amplify it. More precisely, if the above-mentioned function F is represented by a tree structure breakdown, each node in the tree corresponding to an elementary arithmetic (or logical) operation, noise is added at each level of the tree. Thus, it is understandable that if the calculation depth of the F function (and therefore $\bar{F}$) is high (in other words there is a large number of levels in the tree structure representation), the noise level in the result of evaluating the $\bar{F}$ function can become high. When noise exceeds a threshold (that depends on the encryption scheme used), there is no longer a guarantee that the result can be decrypted.

When a homomorphic cryptosystem can be used to perform any calculation depth, it is said to be a Fully Homomorphic Encryption (FHE). Otherwise, it is called a Somewhat Homomorphic Encryption (SHE).

The cryptosystem mentioned above is fully homomorphic. Gentry's basic idea is to used an encryption method with some (bootstrappability), namely the ability to evaluate its own decryption function in addition to basic arithmetic (or logical) operations. It is thus possible to build an FHE encryption method comprising a series of elementary encryption steps separated by decryption steps, each decryption step making the noise level drop below an acceptable threshold and therefore preventing divergence.

At the present time, the most efficient encryption methods are the BGV (Brakerski, Gentry, Vaikuntanathan) method, schemes derived from ATV (Alt-López, Tromer, Vaikuntanathan) and from GHW (Gentry Halevi Waters). Their theoretical security is based on the LWE or RLWE.

A description of an encryption scheme derived from the ATV scheme, called YASHE, is given in the paper by J. W. Bos et al. entitled "Improved security for a ring-based fully homomorphic encryption scheme" published in Cryptology ePrint Archive, Report 2013/075, 2013. Similarly, a description of an encryption scheme derived from the BGV scheme, called FV, is given in the paper by Jungfen Fan et al. entitled "Somewhat practical fully homomorphic encryption" published in Cryptology ePrint Archive, Report 2012/144, 2012.

The principle of the YASHE encryption scheme is briefly summarised below.

A non-null integer ($q \in Z^*$) is considered and $[x]_q$ denotes the value of x modulo q, in other words the unique integer in the $]-q/2, q/2]$ interval as it exists $q \in Z$, in which $x = kq + [x]_q$ ($[x]_q \in Z/qZ$). The ring $R = Z[X]/\langle P(X) \rangle$ is defined as the polynomials quotient ring with coefficients in Z and $\langle P(X) \rangle$ is the ideal generated by the polynomial P(X). The polynomial P(X) is chosen to be irreducible (for example P(X)=$X^d$+1 with d=$2^n$) and therefore R is a field. $R_q$ denotes the polynomials ring R for which the coefficients belong to Z/qZ. $\chi_{err}$ and $\chi_{key}$ denote two distinct distributions on $R_q$, for example two Gaussian distributions with different variances and u($R_q$) denotes the uniform distribution on $R_q$. Finally, we consider an integer t<q and we denote $\Delta=\lfloor q/t \rfloor$ where $\lfloor . \rfloor$ is the next lower interger part.

The YASHE encryption method uses two polynomials f' and g drawn at random in $R_q$ using the distribution $\chi_{key}$. f is assumed such that f=1+tf' is invertible in $R_q$. If f is not invertible, another draw is made of f'.

The result obtained is thus a public key and a private key pair:

$$sk = f \in R_q \quad (5\text{-}1)$$

$$pk = h = t.g.f^{-1} \in R_q \quad (5\text{-}2)$$

The encryption is made generating two polynomials e,u drawn at random in $R_q$, using the distribution $\chi_{err}$:

$$e \leftarrow \chi_{err}; u \leftarrow \chi_{err} \quad (6)$$

and calculating the encrypted message by adding a noise terms as follows:

$$ct = h.u + e + \Delta.m \in R_q \quad (7)$$

Conversely, decryption restores the message m starting from ct and the private key sk=f as follows:

$$m = \left[\left[\frac{t}{q}(f.ct)\right]\right]_t \quad (8)$$

In the following, we will consider a processor capable of executing a program composed of instructions. The program is in the form of a binary file generated using a compiler from a source program in an Assembly language or higher level language. Each instruction is represented by a binary code that respects an instruction format. An instruction is defined by an elementary operation to be done (for example logical and arithmetic operation) and if applicable, a source operand and a destination operand. Operands are given by the content of internal registers or memory locations. Instructions are executed one by one by the processor.

It has been suggested that such a processor can operate directly on the data (or operands) encrypted by a homomorphic encryption. Several approaches can be envisaged.

FIG. 1 diagrammatically represents a first approach that can be used to execute a program on data encrypted by a homomorphic encryption.

With this approach, the entire program is executed homomorphically. More precisely, if the entire program is represented by a function F, this function may be evaluated homomorphically on the encrypted data space.

110 represents a memory area in which data are stored (RAM memory and/or flash memory and/or registers. Data are stored in this area after being encrypted by homomorphic encryption. Unencrypted operands are denoted $m_i$ and encrypted operands are denoted H.Enc$_{pk}$($m_i$), i=1, . . . , M. Similarly, program instructions are stored in a program memory 115.

Function F representing all program instructions is homomorphically evaluated in 120. The homomorphic evaluation of function F has been denoted herein by $\bar{F}$=H.Eval$_{pk}$(F).

The calculation depth F, that is potentially dependent on the program length, can thus become very high. Thus, a noise amplification problem arises that has to be solved by bootstrapping techniques (evaluation of the decryption function in the ciphertext space), that consume large quantities of calculation and memory size resources (expansion of the size of keys and encrypted messages).

FIG. 2 shows an alternative approach. With this approach, data are also stored in memory 210 in a form encrypted by a homomorphic encryption and instructions are stored in the program memory 215. On the other hand, each of the instructions is homomorphically evaluated independently. More precisely; if $F_n$, n=1, . . . N denote the functions performed by these instructions and if it is assumed for simplification that each of them can depend on all data $m_1, \ldots, m_M$, each of these instructions is firstly evaluated homomorphically in 220. Thus, the calculation depth is limited to the depth of a single instruction and consequently is relatively low. The result is then decrypted in 230 using the secret key sk (H.Dec$_{sk}$) to prevent propagation of noise to the next instruction. The result is then reencrypted in 240 by the encryption (H.Enc$_{pk}$) to guarantee confidentiality before being stored in the memory zone, for example in an intermediate register. It can then be used during the homomorphic evaluation of a later instruction.

The major disadvantage of this approach is that the result of the evaluation of the instruction is unencrypted during execution, which reduces confidentiality and make some attacks possible.

Consequently, the purpose of this invention is to disclose a method of executing a program operating on data encrypted by homomorphic encryption that is confidential, in the sense that it is never necessary to expose unencrypted data or evaluated results.

PRESENTATION OF THE INVENTION

This invention is defined by a method of executing a program operating on data encrypted by means of a homomorphic encryption, said program comprising a plurality of instructions, each instruction possibly being represented by a function of said data, execution of said instruction including a homomorphic evaluation by a processor of said function starting from said encrypted data, characterised in that:

(a) the result of said evaluation is masked by a first summation operation with a random sequence previously encrypted by said homomorphic encryption, said first summation operation in the ciphertext space corresponding to a modulo 2 summation operation in the plaintext space;

(b) the result of said evaluation thus masked is firstly decrypted and then reencrypted by means of said homomorphic encryption; and (c) the result obtained in step (b) is unmasked by a second summation operation with said random sequence previously encrypted by said homomorphic encryption, said second summation operation in the ciphertext space corresponding to a modulo 2 summation operation in the plaintext space; the result of the second summation operation being stored in a memory zone.

According to one variant, steps (a), (b) and (c) are performed by a coprocessor distinct from said processor.

According to a first embodiment, said instructions are stored in the form of functions expressed in the plaintext space, said instructions being translated during the boot by expressing said functions in the ciphertext space before being stored in a program memory.

According to a second embodiment; said instructions are stored in a program memory in the form of functions expressed in the plaintext space, said functions being translated on the fly, as they are executed, expressing said functions in the ciphertext space.

Encryption may be a fully homomorphic encryption, or advantageously a somewhat homomorphic encryption. In the latter case, it may for example by a BGV, ATV or YASHE encryption.

BRIEF DESCRIPTION OF THE DRAWINGS

Other characteristics and advantages of the invention will become clear after reading a preferred embodiment of the invention with reference to the appended figures among which.

DETAILED PRESENTATION OF PARTICULAR EMBODIMENTS

In the following description, we will consider a program comprising a plurality of instructions that can be executed sequentially by a processor (CPU or microcontroller). The instructions operate on data stored in a memory zone (for example flash memory, RAM, registers). These data are stored in a form encrypted by means of a homomorphic encryption, for example a somewhat homomorphic encryption (SHE), characterised by its public key pk and its secret key sk.

Each instruction is evaluated homomorphically. More precisely, each instruction can be expressed in the form of a logical operation (combination of AND, OR, NOT elementary operations) or an arithmetic operation (combination of elementary addition and multiplication operations), either in the plaintext space (function F) or equivalently (function $\bar{F}$) in the ciphertext space. The translation from F to $\bar{F}$ can be made offline, in other words before the program is stored. The translation could be made during the boot, in this case all translated instructions being stored in a program memory, or it can be made by the processor on the fly, instruction by instruction.

Figure 3:
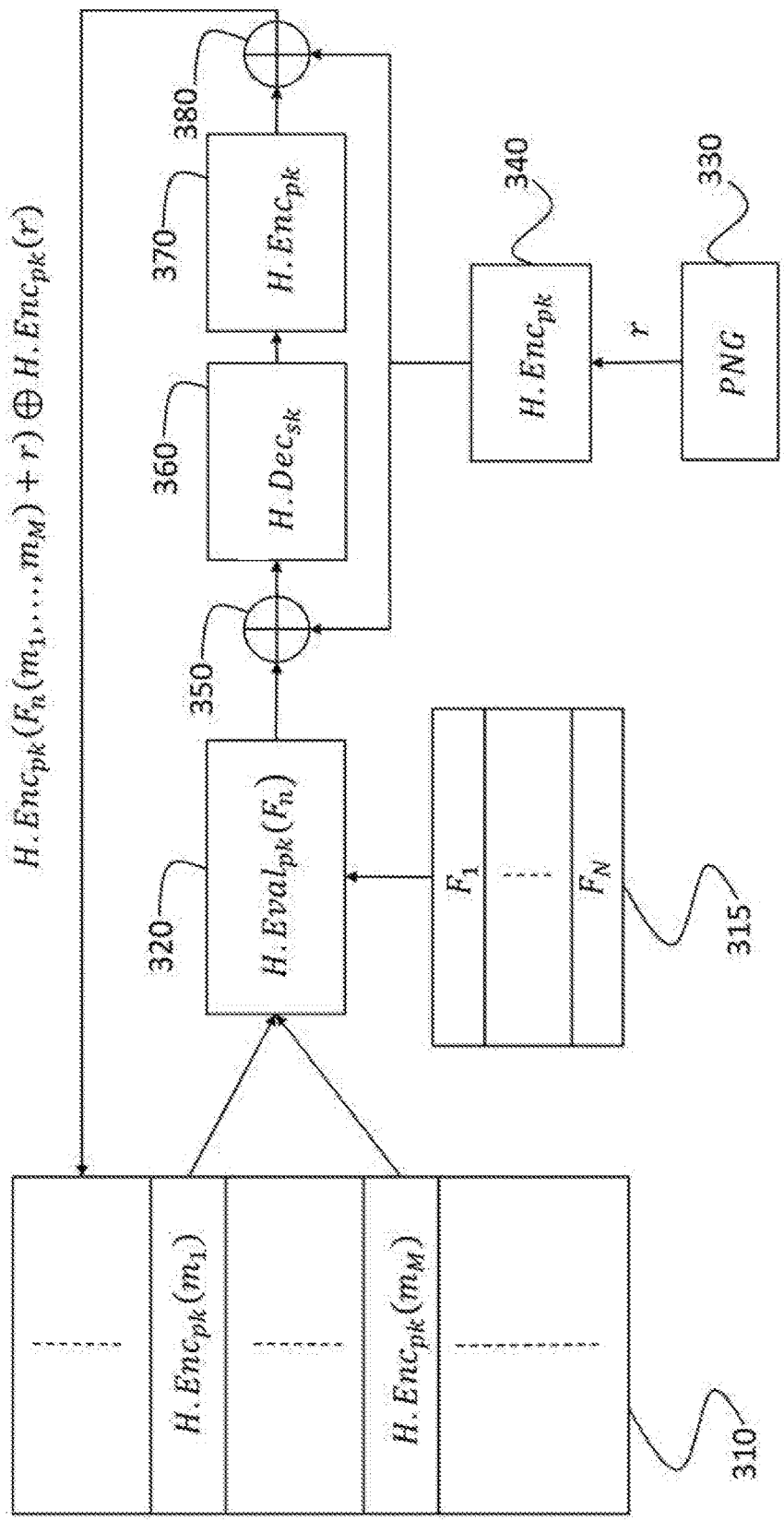
FIG. 3 diagrammatically represents the principle of a method of confidential execution on data encrypted by a homomorphic encryption according to one embodiment of the invention.

FIG. 3 diagrammatically represents the principle of a method of confidential execution on data encrypted by a homomorphic encryption according to one embodiment of the invention.

310 denotes the memory space in which encrypted data are stored and 315 denotes the memory space in which program instructions are stored (in this case assumed to be expressed in the ciphertext space).

Each new instruction $F_n$ is evaluated homomorphically in 320, in other words an evaluation result $H.Eval_{pk}(F_n)$ is obtained as in the second approach envisaged in the introduction part.

However, unlike the second case envisaged above, the result of the evaluation is homomorphically masked before it is decrypted.

More precisely, a random mask r is generated in 330 by means of a cryptographic quality pseudo-random sequence generator or preferably random sequence generator known in itself.

A pseudo-random sequence generator is generally composed of one or several shift registers looped back on themselves and/or between themselves, the outputs of which are combined linearly or non-linearly. The size of the mask is also chosen to be equal to the length of the evaluation result $H.Eval_{pk}(F_n)$.

A pseudo-random generator uses a physical entropy source, for example such as a thermal noise of a resistance, and encrypts it using a symmetric encryption.

The mask could be determined as the sum of an arbitrary number of random or pseudo-random numbers. This arbitrary number can also be random or semi-random, so as to resist higher order attacks.

In 340, a homomorphic encryption is then made on the random mask r using the same cryptosystem (and particularly the same public key pk) as that used to encrypt the data.

Alternatively, the masks could have been generated in encrypted form directly or previously stored in encrypted form in a memory.

In all cases, the mask thus encrypted, $H.Enc_{pk}(r)$ is then added by means of a summation operation in the ciphertext space (in other words by means of the operation denoted $\oplus$) to the result of the homomorphic evaluation result $H.Eval_{pk}(F_n)$. By definition, the $\oplus$ summation operation corresponds to the summation operation in the plaintext space, +, in this case considered as a modulo 2 addition (in other words bit by bit with no carry over). Advantageously, the homomorphic encryption is chosen such that the summation operation $\oplus$ is also a modulo 2 summation operation. This is the case particularly for the ATV and BGV encryption algorithms mentioned above The result of the evaluation, masked by the random mask, is then decrypted using the secret key sk in 360. Advantageously, the secret key is stored in a secure register in the processor. This decryption prevents propagation of noise from one instruction to the next, as explained above. The result of the decryption is simply $F_n(M_1, \ldots, m_M)+r$.

The result of the decryption is then encrypted again using the homomorphic encryption 370, then unmasked in 380 by adding it to the encrypted random mask $H.Enc_{pk}(r)$ by means of the $\oplus$ operation (advantageously a bit by bit summation making use of an XOR as described above) in 380.

The sum thus obtained is then stored in the memory zone 310.

Due to the homomorphic masking before the result decryption operation, the result of the $F_n(m_1, \ldots, m_M)$ instruction does not appear unencrypted at any step in its execution by the processor.

Since the demasking operation in 380 was done homomorphically in the ciphertext space, it does not reveal the result of the instruction.

It will be understood that the unmasked result $H.Enc_{pk}(F_n(m_1, \ldots, m_M)+r) \oplus H.Enc_{pk}(r)$ is in encrypted form and that there is no security problem with storing it in the memory zone. Its processing by a later instruction will consist of homomorphic encryption of $F_n(m_1, \ldots, m_M)$, and will therefore be identical to the processing that would be done on $F_n(m_1, \ldots, m_M)$, because:

$$Dec_{pk}(H.Enc_{pk}(F_n(m_1, \ldots, m_M)+r) \oplus H.Enc_{pk}(r)) = Dec_{pk}(H.Enc_{pk}(F_n(m_1, \ldots, m_M)+r)) + Dec_{pk}(H.Enc_{pk}(r)) = F_n(m_1, \ldots, m_M)+r+r = F_n(m_1, \ldots, m_M) \quad (9)$$

Figure 1:
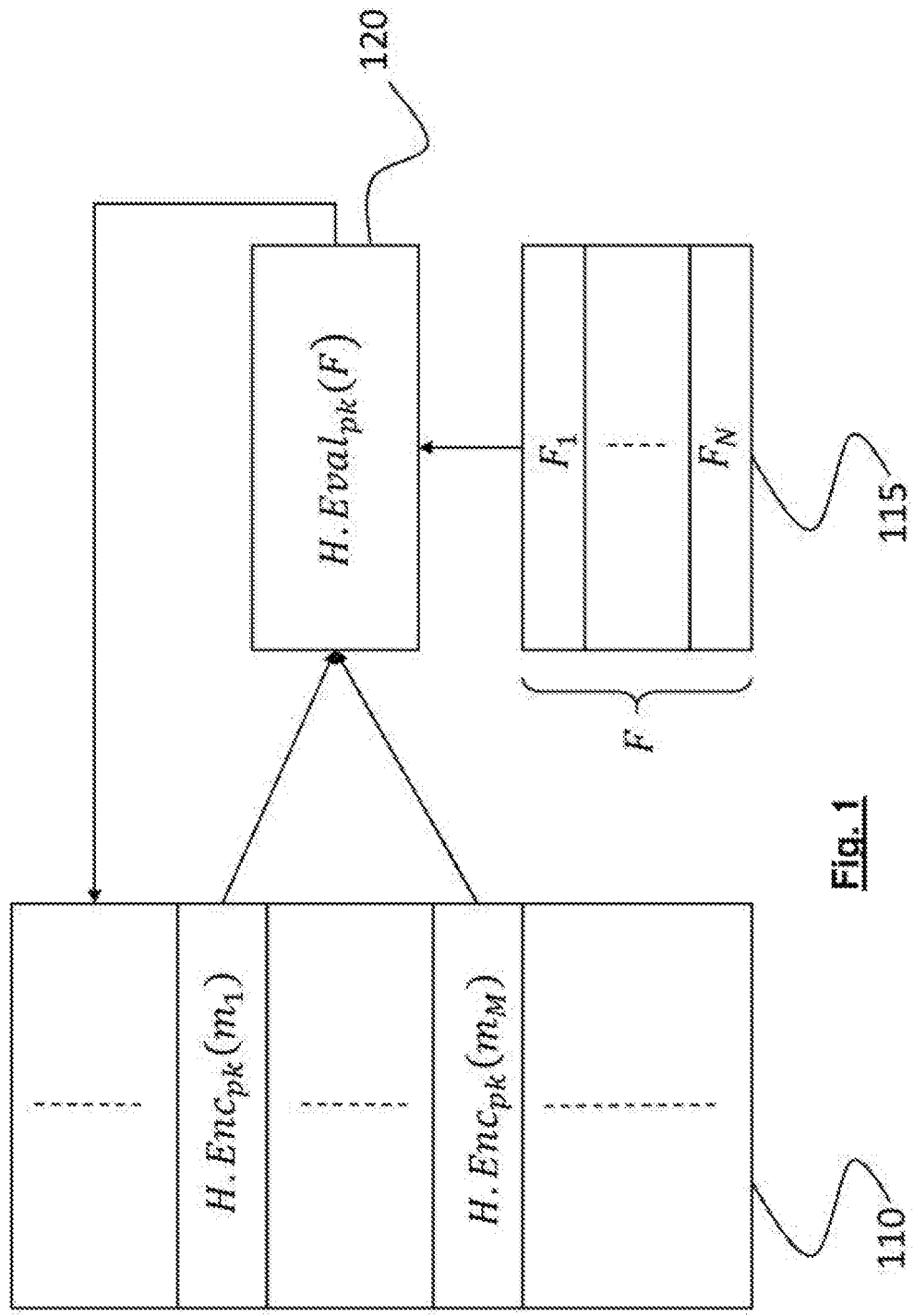
FIG. 1 diagrammatically represents a first example execution of a program on data encrypted by a homomorphic encryption.
Figure 2:
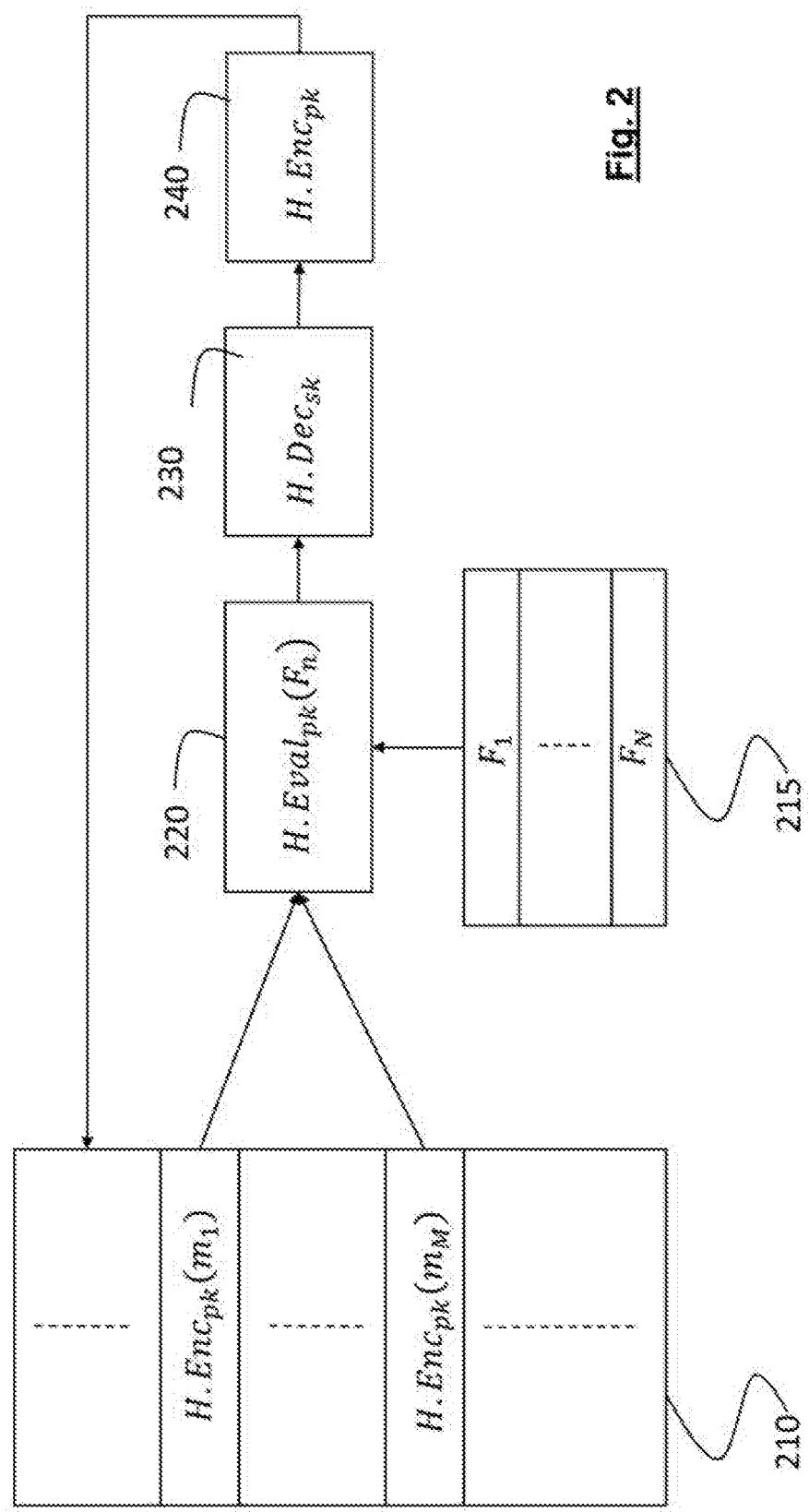
FIG. 2 diagrammatically represents a second example execution of a program on data encrypted by a homomorphic encryption.

Unlike the second approach illustrated in FIG. 2, the next instruction only needs to take account of noise corresponding to a single operation in the ciphertext space, in fact the masking operation. Since the dimensions of this noise are well chosen, there is no need for additional decryption (bootstrapping step).

In one hardware implementation, operations 320 to 380 can be done by the processor itself, or according to another embodiment, can be distributed between the processor and a dedicated coprocessor. In this case, operations 330 to 380 that do not need access to the instruction, can be handled by the coprocessor, that limits its actions to homomorphic masking on the result of the instruction before storing it in memory.

Decryption in 360 is potentially vulnerable to physical attacks (and particularly attacks through auxiliary channels) aimed at determining the secret key sk of the cryptosystem. The circuit designed for decryption could also be made robust using a generic transformation method like that described for example in the paper by Y. Ishai et al. entitled "Private circuits: securing hardware against probing attacks" published in Proc. of Annual International Cryptology Conference, 2003.

The invention claimed is:

1. A method of executing a program operating on data encrypted with a homomorphic encryption, said program comprising a plurality of instructions, each instruction being represented by a function of said data, execution of said instruction including a homomorphic evaluation by a processor of said function starting from said encrypted data, wherein:
  (a) a result of said evaluation is masked by a first summation operation with a random sequence previously encrypted by said homomorphic encryption, said first summation operation in ciphertext space corresponding to a modulo 2 summation operation in plaintext space;
  (b) the result of said evaluation thus masked is firstly decrypted and then reencrypted with said homomorphic encryption;
  (c) the result obtained in step (b) is unmasked by a second summation operation with said random sequence previously encrypted by said homomorphic encryption, said second summation operation in the ciphertext space corresponding to a modulo 2 summation operation in the plaintext space, the result of the second summation operation being stored in a memory zone.

2. The method of executing a program according to claim 1, wherein steps (a), (b) and (c) are performed by a coprocessor distinct from said processor.

3. The method of executing a program according to claim 1, wherein said instructions are stored in the form of functions expressed in the plaintext space, said instructions being translated during a boot operation by expressing said functions in the ciphertext space before being stored in a program memory.

4. The method of executing a program according to claim 1, wherein said instructions are stored in a program memory in the form of functions expressed in the plaintext space, said functions being translated on the fly, as they are executed, expressing said functions in the ciphertext space.

5. The method of executing a program according to claim 1, wherein the encryption is a fully homomorphic encryption.

6. The method of executing a program according to claim 1, wherein the encryption is a somewhat homomorphic encryption.

7. The method of executing a program according to claim 6, wherein the encryption is a BGV encryption.

8. The method of executing a program according to claim 6, wherein the encryption is an ATV encryption.

9. The method of executing a program according to claim 6, wherein the encryption is a YASHE encryption.

* * * * *